UNITED STATES PATENT OFFICE.

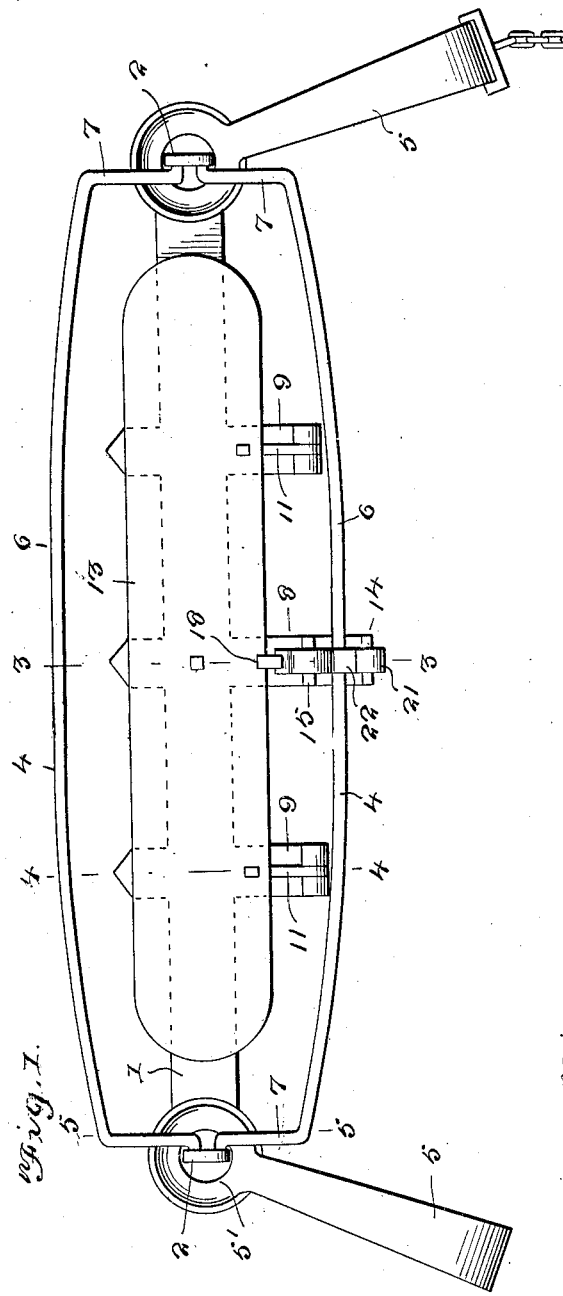

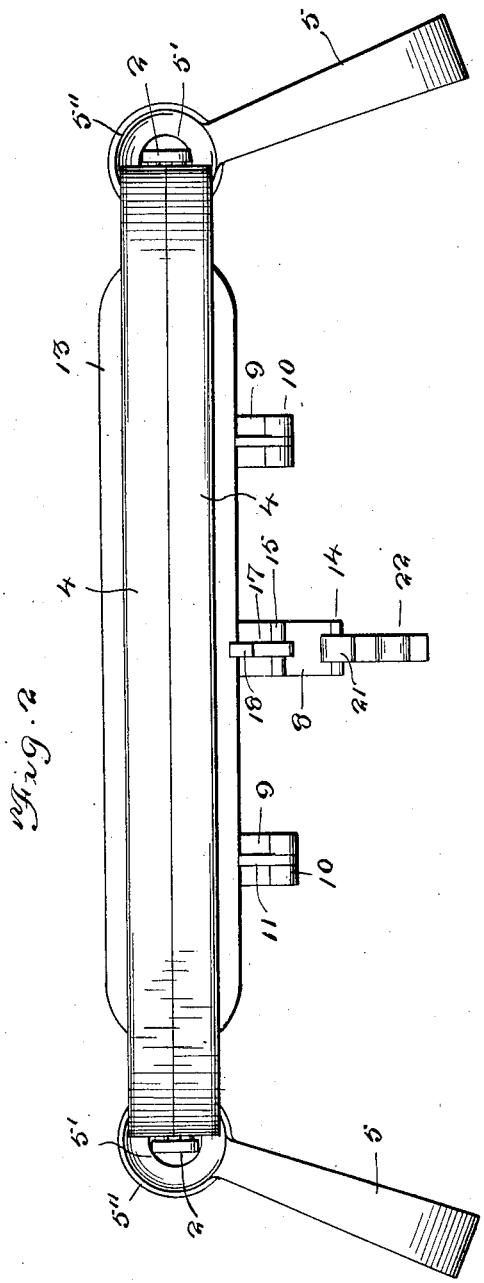
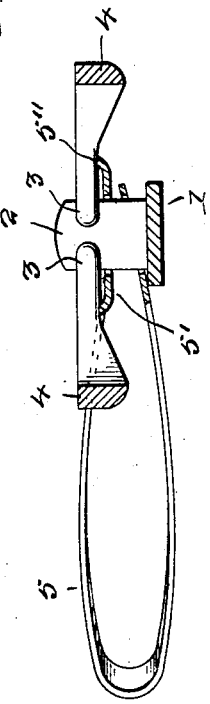

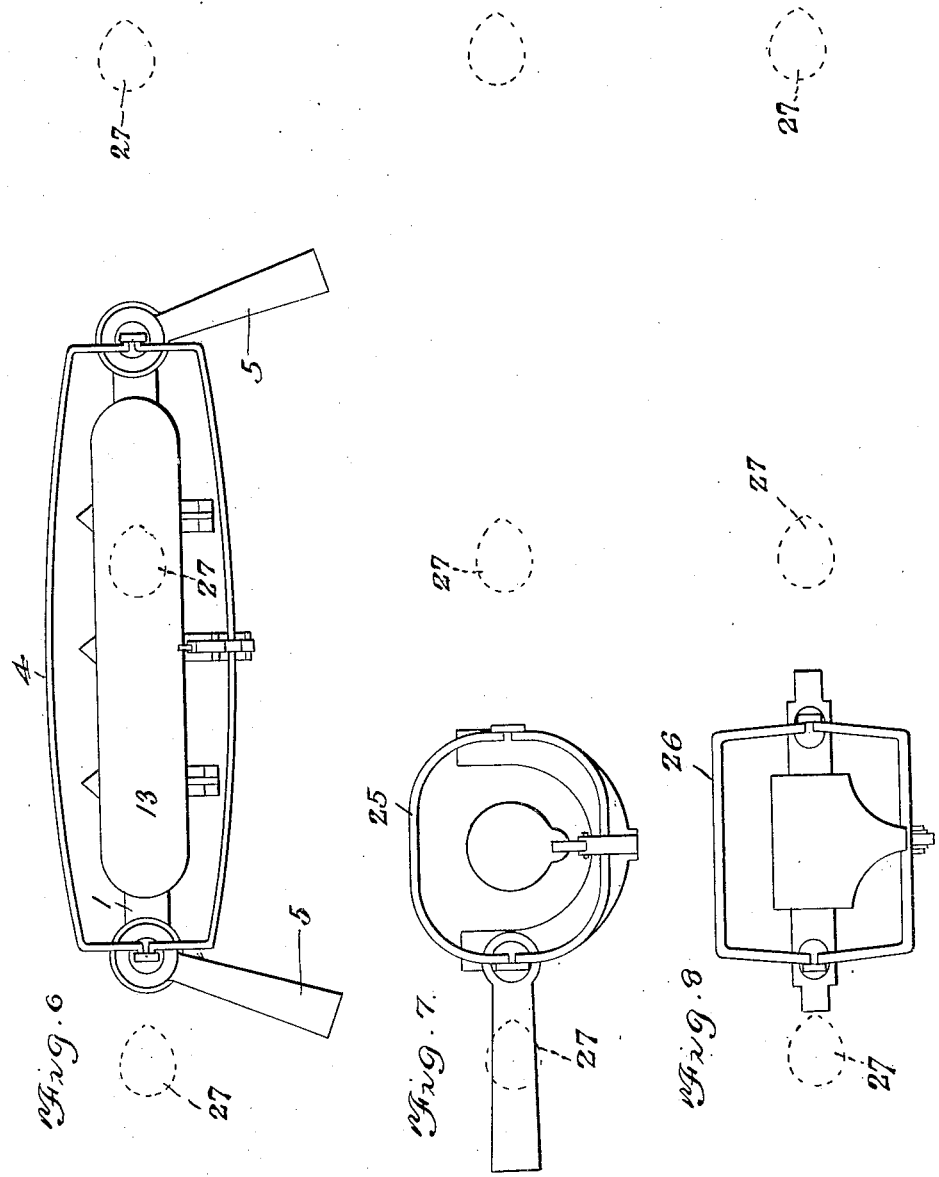

NELS S. NELSON AND AXEL BOODE, OF LACOMBE, ALBERTA, CANADA.

TRAP.

1,337,149.  Specification of Letters Patent.  Patented Apr. 13, 1920.

Application filed July 15, 1919. Serial No. 310,885.

*To all whom it may concern:*

Be it known that we, NELS S. NELSON and AXEL BOODE, subjects of the King of Great Britain, residing at Lacombe, in the Province of Alberta and Dominion of Canada, have invented new and useful Improvements in Traps, of which the following is a specification.

This invention has reference to improvements in animal traps.

From experience we have found that the well known types of spring jaw traps are not altogether reliable, for the reason that the same, even in the largest makes thereof provide only a comparatively small pan and permit of the animal passing directly thereover without springing the trap. Also in such classes of traps small animals or birds lighting on the trip pan, although not heavy enough to spring the trap, will slightly move the pan so that the same is not brought back to proper position, and consequently when the pan has been stepped on several times they will finally spring the trap, thus spoiling the trapper's set.

It is the object of the present invention to produce a spring jaw trap of a size, shape and construction which will overcome the before-mentioned deficiencies of the ordinary construction.

Other objects and advantages will appear as the nature of the invention is better understood, reference being had to the accompanying drawings, in which:

Figure 1 is a top plan view of a trap constructed in accordance with our invention in set position.

Fig. 2 is a similar view of the trap in sprung position.

Fig. 3 is a sectional view approximately on the line 3—3 of Fig. 1.

Fig. 4 is a sectional view approximately on the line 4—4 of Fig. 1.

Fig. 5 is a sectional view approximately on the line 5—5 of Fig. 1, and looking in the direction of the arrows.

Fig. 6 is a plan view illustrating diagrammatically the maximum stride of a fox or coyote showing how the animal will positively contact with the pan and trip the same in a trap constructed in accordance with our invention.

Figs. 7 and 8 are similar views but showing the manner in which a fox or coyote taking the same strides as illustrated in Fig. 6 will pass over the ordinary construction of traps without contacting with the pans thereof, and consequently without springing the trap.

Referring now to the drawings in detail, the numeral 1 designates the base of the trap, the same having its ends upset as at 2, in the usual manner, and the said upset ends being provided with spaced openings to receive the offset or shaft portions 3 on the ends of the jaws 4. The usual double leaf springs 5 are employed for springing the jaws to closed position as illustrated in Fig. 3 of the drawings. Excepting for the length and shape of the jaws the above construction is common to ordinary traps.

The base 1, however, is of a materially greater length than the base of an ordinary trap, such for instance as the trap illustrated in Fig. 7 of the drawings, and the jaws 4 have their side or gripping members 6 arched or curved outwardly from their angle ends 7 to the center thereof. This construction strengthens the jaws throughout the length thereof, the maximum strength, however, being at the center of the said jaws at or adjacent which the leg of the animal is most liable to be engaged. The jaws are approximately eighteen inches in length, such length being most desirable when the trap is employed for wolves, coyotes and foxes, for which animals the trap is primarily devised. It will be thus noted that the jaws are of a far greater length than the jaws employed in any ordinary construction of traps.

On the base 1 there is formed or secured three cross pieces, one being arranged at the center of the base and indicated by the numeral 8, the others, indicated by the numerals 9 being arranged a suitable distance to the sides of the central cross-piece 8. The cross pieces are of a greater length than the width of the base 1, each of the said cross pieces on one side of the base being formed with upstanding flanges. The flanges on the cross pieces 9 have their upper ends bent upon themselves to provide eyes and the said eyes are preferably centrally slotted and receive in the said slots the ends of plates 11 that support the trip pan 13. These plates 11 are pivoted in the eyes as indicated by the numerals 12. The trip pan is of a slightly less length than the jaws, being approximately fifteen inches in length and of a desired width.

The central cross piece 8 extends beyond one side of the base 1 a greater distance than the cross pieces 9, the referred to upstanding portion or flange, indicated by the numeral 14 being formed on the end of this portion of the cross piece, and as a consequence the upstanding portion or flange 14 is disposed a considerable distance outwardly of the upstanding portions or flanges 10 on the cross pieces 9, the object and advantage of such construction will presently be apparent. Secured to or formed with the cross piece 9, inward of the flange 14, and in a direct line with the flanges or upstanding ends 10 of the cross pieces 9 is an upstanding lug 15. While not illustrated in the drawings, the lug 15 and the flanges 10 on the cross pieces 9 are of a less length than the upstanding end or flange 14 on the cross piece 8. This is desirable in order to arrange the pan of the trap as close to the base as possible.

The lug 15, at the outer end thereof is provided with a central slot through which passes the rounded end of a plate or bar 17 that is secured to the under face of the trip pan 13 at the center thereof, and consequently hingedly connects the trip pan to the central cross piece 8. The bar or plate 17 is provided with an upstanding lug 18 that is preferably received in a notch 19 entering from one of the edges of the trip pan 13, and the said lug has its outer face provided with a notch 20. Hingedly secured, as at 21 centrally to the outer or upper end of the flange 14 is a latching dog 22. This dog is preferably provided with an approximately central outwardly rounded portion 23 terminating in a straight lip 24, and the lip 24 is designed to be received in the notch 20 of the lug 18 when the outer straight portion of the dog, adjacent the hinge 21 thereof engages with one of the jaws 4 to hold both of the jaws in open position as illustrated in Figs. 2 and 5 of the drawings. The upper leads or arms of the springs 5, at the outer ends thereof which engage the angle ends 7 of the jaws 6 are widened and dished downwardly and inwardly toward the eye portions 5' thereof. By this arrangement the ends 7 of the jaws 6, and particularly the jaw engaged by the dog are contacted only by the edges of the dished or concaved ends of the springs, and as a consequence a quicker action by the springs upon the jaws is obtained than could be obtained by the ordinary construction. The first action of the springs, when the trap is sprung is to swing the jaws toward each other, the jaws being thereafter engaged by the eye portions of the springs, and as a result lighter springs, which may be readily set by hand may be employed with our improved trap and better and more positive results will be obtained.

It will be noted that one of the jaws 6 contacts with the straight under face of the dog 22 approximately centrally between the lug 15 and the flange 14, or more strictly speaking nearer the flange 14 than the lug 15. As previously stated, the lug 15 is in a direct line with the flanges 10 on the cross pieces 9 and the pressure exerted by the jaw on the dog is to one side of the center of the dog, being nearest its hinge connection with the offset end of the cross piece 8. The notch 20 in the lug 18 is disposed a considerable distance inward of the hinge connection between the pan 13 and the lug 15 and the engagement of the dog with the said lug exerts what may be termed a lifting action with respect to the pan. This is a very important feature of the invention, as small animals, birds, etc., lighting on the pan will permit of a limited swinging movement in a downward direction of the pan which is at all times resisted by the engagement of the dog with the lug and as a consequence when the pan is relieved of weight not sufficient to spring the trap, the said pan will be returned to its initial horizontal position.

For a full understanding of the advantages of our improvement, reference is to be had to Figs. 5, 6 and 7 of the drawings. The maximum stride of a fox or coyote is fourteen inches. In Figs. 7 and 8 ordinary No. 3 spring jaw traps are illustrated and for distinction are indicated by the numerals 25 and 26 respectively. These traps are similar to those most commonly employed for trapping foxes and coyotes. It will be noted by reference to the figures that the traps are arranged in the same position as is our improved trap and it will be also noted that the last mentioned traps are of a materially less length than is our trap. Foxes and coyotes invariably walk with foot treads perfectly in line as indicated by the dotted lines 27 in the referred to figures of the drawings. Should the animal travel over the trap constructed in accordance with our invention it will be seen that one of his feet will rest on the pan of our trap, and consequently spring the jaws thereof. Should the animal travel exactly as shown in Fig. 6, but over the traps illustrated in Figs. 7 and 8, it will be seen that he will completely pass over the said traps without contacting with the pans thereof and consequently not springing the jaws. It will therefore be noted that the size and proportion of our improved trap are vital features of importance and we have found from experience that many fur bearing animals have passed over the ordinary construction of traps, which we formerly employed, so that many valuable furs have been thus lost. The method in which the dog of our trap and the manner in which it engages in the notch of the lug positively prevents the accidental springing of the trap should birds or small animals rest thereon regardless of the part of the pan they light or rest on and regardless of the number of times they rest on said pan. In the foregoing we have specifically set forth the advantages of our improved trap in trapping fox, coyotes and similar animals who travel in a straight line, in which instance the trap is set directly in the center of the trail, but, from experience we have found that by setting our trap to one side of the trail of broad and chunky animals such as beaver, coon, etc., our improvement has been found very efficient in trapping this class of animals.

It is believed, from the foregoing description, when taken in connection with the drawings that the simplicity and advantages of our improvement will be understood and appreciated without further detailed description.

Having thus described the invention, what is claimed as new, is:—

1. A trap of the class described including an elongated base having upset ends, jaws having offset ends hingedly connected to the ends of the base, said jaws being gradually widened from their ends to their center, U-springs between the base and the ends of the jaws for normally swinging the jaws closed, a plurality of cross pieces on the base, upstanding posts on the ends of the cross pieces, plates pivotally secured thereto, a pan of a slightly less length than that of the jaws resting on said plates and connected therewith, the intermediate cross piece having one of its ends flanged, a dog hingedly connected to the flange, said intermediate cross piece having an upstanding lug, a plate hingedly secured to the lug and connected to the under face of the pan, an upstanding lug on said plate having its outer edge notched, and the free end of the dog designed to be received in said notch when the jaws are in spread position.

2. A trap of the class described including an elongated base having upset ends, jaws having offset ends hingedly connected to the ends of the base, said jaws being gradually widened from their ends to their center, U-springs between the base and the ends of the jaws for normally swinging the jaws closed, a plurality of cross pieces on the base, upstanding posts on the ends of the cross pieces, plates pivotally secured thereto, a pan of a slightly less length than that of the jaws resting on said plates and connected therewith, the intermediate cross piece having one of its ends flanged, a dog hingedly connected to the flange, said dog being constructed of spring material and having an arched portion adjacent to the free end thereof, said intermediate cross piece having an upstanding lug, a plate hingedly secured to the lug and connected to the under face of the pan, an upstanding lug on said plate having its outer edge notched, and the free end of the dog designed to be received in said notch when the jaws are in spread position.

In testimony whereof we affix our signatures.

NELS S. NELSON.
AXEL BOODE.